United States Patent
Bartkowiak (10) Patent No.: US 6,269,160 B1
(45) Date of Patent: Jul. 31, 2001

(54) COMMUNICATIONS DEVICE INCLUDING AN IMPROVED CPE ALERTING SIGNAL (CAS) DETECTION SYSTEM

(75) Inventor: John G. Bartkowiak, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/062,894

(22) Filed: Apr. 20, 1998

(51) Int. Cl.$^7$ ................ H04M 1/00; H04M 3/00
(52) U.S. Cl. ................ 379/386; 379/142; 379/283
(58) Field of Search .................. 379/93.35, 142, 379/164, 283, 384, 373, 386, 402, 406, 410

(56) References Cited

U.S. PATENT DOCUMENTS

| | | | |
|---|---|---|---|
| 5,263,084 | 11/1993 | Chaput et al. | 379/142 |
| 5,592,544 | * 1/1997 | Murata et al. | 379/283 |
| 5,818,929 | * 10/1998 | Yaguchi | 379/418 |
| 5,926,541 | * 7/1999 | Irie | 379/93.35 |
| 5,926,542 | * 7/1999 | Huang et al. | 379/93.35 |
| 5,937,059 | * 8/1999 | Kim et al. | 379/386 |
| 5,974,138 | * 10/1999 | Sambhwani et al. | 379/373 |

OTHER PUBLICATIONS

MITEL Product Data Sheet, Chip Model No. CMOS MT8843, Calling Number Identification Circuit 2, Issue 3, Apr. 1996, pp. 5–31–5–52.

* cited by examiner

Primary Examiner—Curtis Kuntz
Assistant Examiner—George Eng
(74) Attorney, Agent, or Firm—Conley, Rose & Tayon PC; Jeffrey C. Hood (57) ABSTRACT

A communications device is presented including a DTMF detector for detecting a DTMF signal. When the DTMF signal is a Mode 2 Caller ID CAS, the first DTMF tone has a frequency of about 2130 Hz, and the second DTMF tone has a frequency of approximately 2750 Hz. An input signal includes signal energy within a first portion of the input signal frequency range which includes the first DTMF tone, signal energy within a second portion of the input signal frequency range which includes the second DTMF tone, and signal energy within a third portion of the input signal frequency range which excludes the first and second DTMF tones. The DTMF signal detector includes a first and second tone detection units, an extraneous signal detection unit, and detection logic. The first and second tone detection units receive the input signal and produce an output signal dependent upon the signal energy within the respective first and second portions of the input signal frequency range. The extraneous signal detection unit also receives the input signal and produces an output signal dependent upon the signal energy within the third portion of the input signal frequency range. The detection logic receives the output signals produced by the first and second tone detection units and the extraneous signal detection unit, and produces a DTMF detect signal dependent upon the output signals.

16 Claims, 8 Drawing Sheets

COMMUNICATIONS DEVICE INCLUDING AN IMPROVED CPE ALERTING SIGNAL (CAS) DETECTION SYSTEM

FIELD OF THE INVENTION

The present invention relates to telecommunications, and more particularly to a system and method for the detection of dual-tone multifrequency (DTMF) signals.

DESCRIPTION OF THE RELATED ART

Telephone subscribers communicate via a vast telephone network maintained by many different telephone service providers. A telephone subscriber's communications devices are typically connected in parallel to a two-wire telephone line which links a subscriber's premises to a telephone service provider's central office. Communications devices include telephones, answering machines, speakerphones, facsimile (fax) machines, and communications modems.

Figure 1:
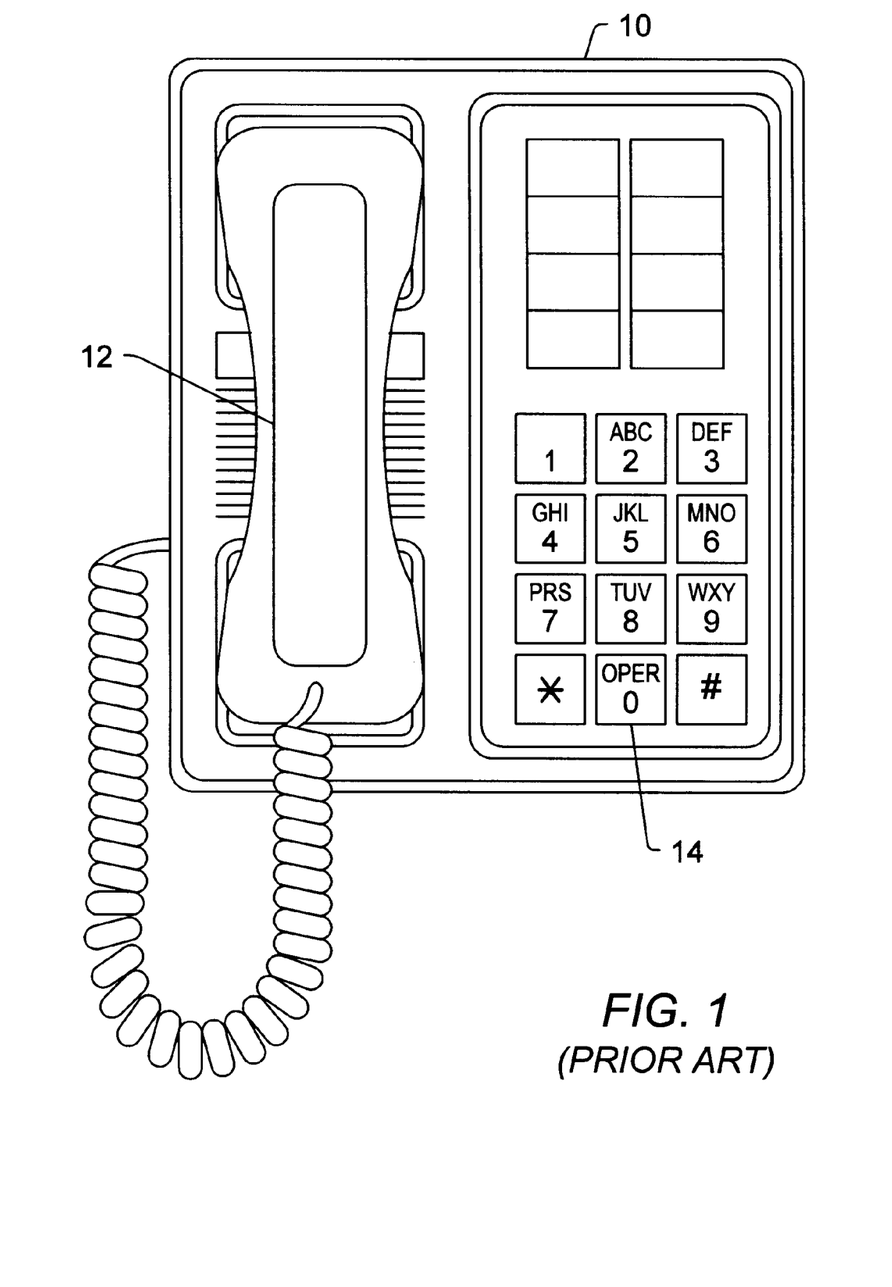
FIG. 1 is a top plan view of a telephone.

FIG. 1 is a top plan view of a modem telephone 10, the most familiar of such communications devices. Telephone 10 is also generally referred to as customer premises equipment (CPE). Telephone 10 is adapted to be coupled to a two-wire telephone line, and includes a handset 12 and a keypad 14.

Figure 2:
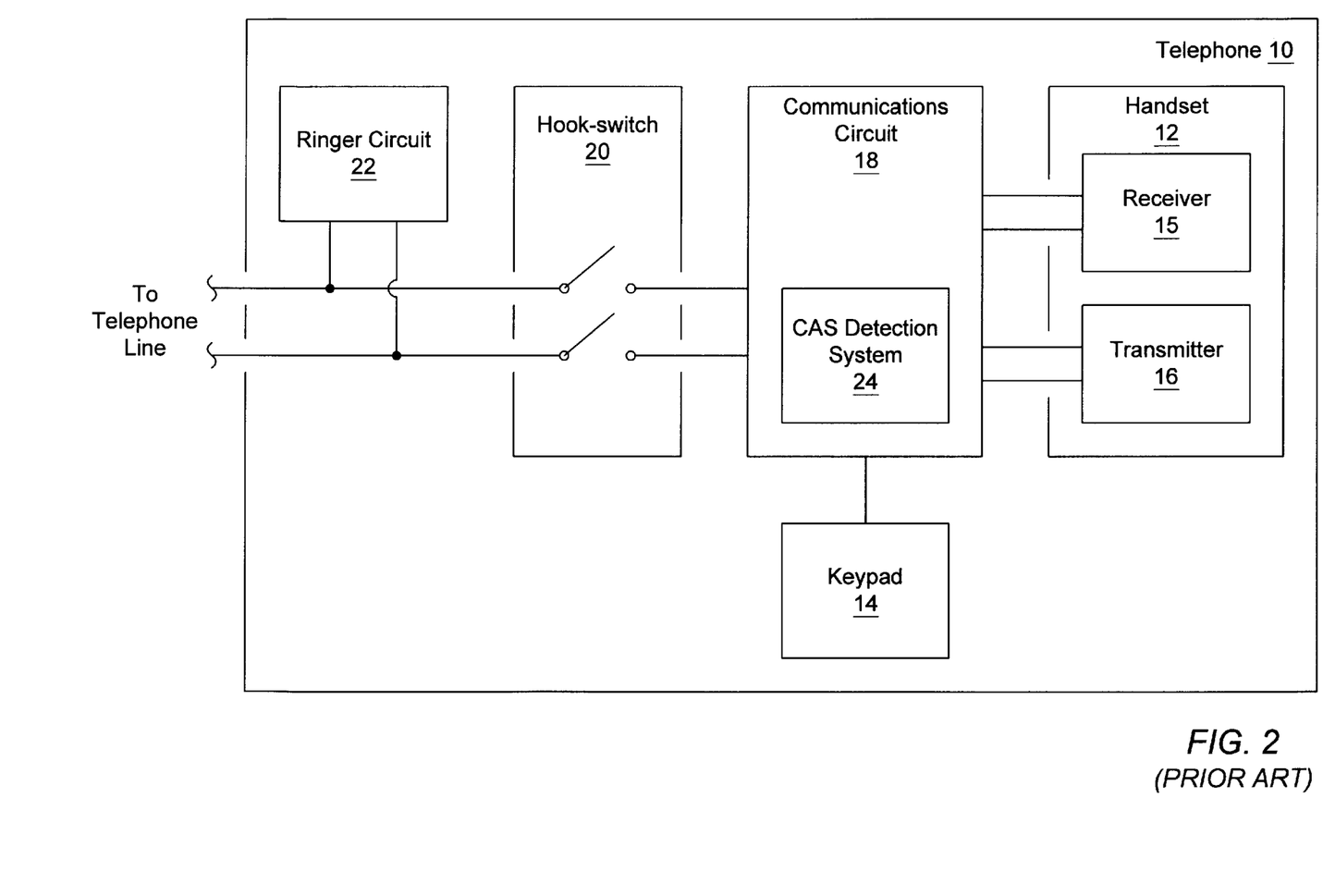
FIG. 2 is a block diagram of a telephone which performs CAS detection, wherein the telephone includes a communications circuit.

FIG. 2 is a block diagram of telephone 10. Handset 12 includes a receiver 15 and a transmitter 16. Receiver 15 is designed to be placed over a user's ear during use, and transmitter 16 is designed to be positioned in close proximity to the user's mouth during use. Handset 12 is coupled to a communications circuit 18. When telephone 10 is not in use, a hookswitch 20 is in an open position, and communications circuit 18 is disconnected from the telephone line. Only a ringer circuit 22 is connected to the telephone line when telephone 10 is not in use.

When a calling party places a telephone call to a receiving party, switching equipment in the central office transmits a series of ring signals over the receiving party's telephone line. The ring signals cause the ringer circuit of the receiving party's telephone to generate sounds which alert the receiving party to an incoming telephone call. At the same time, the switching equipment sends a series of ring-back signals to the calling party to let the calling party know that the telephone call is being placed. When the receiving party enables handset 12 (e.g., by lifting handset 12) to answer the incoming telephone call, hookswitch 20 closes, connecting communications circuit 18 to the telephone line. Switching equipment senses the closure of hookswitch 20 and completes an electrical circuit between the calling party and the receiving party. A telephone conversation takes place as communications circuit 18 couples the calling party's voice signals from the telephone line to receiver 15, and couples the receiving party's voice signals from transmitter 16 to the telephone line.

Placing a call to another telephone subscriber using telephone 10 involves enabling handset 12 and "dialing" the subscriber's telephone number. The act of "dialing" a telephone number on telephone 10 typically involves pressing numbered buttons of keypad 14 corresponding to the subscriber's telephone number in sequence. This form of dialing is known as Touch-Tone® dialing. The Touch-Tone® dialing system has nearly replaced the older rotary pulse-type dialing system in North America. Pressing a button on keypad 14 causes communications circuit 18 to generate a dual-tone multifrequency (DTMF) signal comprising a combination of two non-harmonic tones. The DTMF signal is received by switching equipment in the telephone service provider's central office and decoded. The sequence of telephone dialed telephone numbers is used to determine which telephone subscriber is to receive the telephone call.

The frequencies of the two tones in a DTMF signal are chosen such that they are not exact integer multiples (i.e., harmonics) of any frequency greater than 1 hertz (Hz). For example, 250 Hz and 375 Hz are not acceptable dual tones because they are integer multiples of 125 Hz. On the other hand, 250 Hz and 333 Hz are acceptable dual tones because they are not integer multiples of any frequency greater than 1 Hz. Such enharmonic frequencies are used to prevent false DTMF signal detections. In addition to telephone dialing, DTMF coding is also popular in interactive control applications, such as telephone banking, electronic mail systems, and answering machines. Such applications allow a user to select options from a menu by sending DTMF signals from any Touch-Tone® telephone.

Call Waiting is a telephone service which alerts a receiving party, engaged in a telephone call with a first party, to a new incoming call from a second (calling) party. The central office transmits a subscriber alerting signal (SAS) to the receiving party, and the calling party receives the customary series of ring-back signals. The SAS may be a short voice signal interruption accompanied by a clicking sound, or a short 440 Hz tone burst. The receiving party may answer the incoming call by "flashing" the hookswitch (i.e., opening the hookswitch momentarily). The receiving party may subsequently go back and forth between the first and second parties by flashing the hookswitch. Call Waiting thus allows a subscriber to answer an incoming telephone call while involved in a telephone conversation.

Caller ID is the name given to subscriber services which provide information about a calling party to a receiving party before the receiving party would normally answer an incoming telephone call. Like Call Waiting, Caller ID is available to telephone subscribers for a small monthly fee. Caller ID information is transmitted in digital format, one bit at a time, at a rate of 1,200 bits per second. Devices which receive, store, and display Caller ID information are widely available. Caller ID equipment complies with a set of standards set forth by the Bell Communications Research Group (Bellcore). Mode 1 Caller ID transmits information about a calling party between a first ring signal and a second ring signal. Mode 2 Caller ID, also known as calling identity delivery on call waiting, allows subscribers with Call Waiting to receive calling party information while engaged in a telephone call and before answering an incoming telephone call.

When a subscriber has Mode 2 Caller ID service, is engaged in a telephone call with a first party, and an incoming call from a second calling party occurs, the central office follows the SAS with an alerting signal directed to the subscriber's Mode 2 Caller ID equipment. The term customer premises equipment (CPE) includes a subscriber's Mode 2 Caller ID equipment, and the second alerting signal is known as the CPE alerting signal (CAS). The CAS is a DTMF signal comprising simultaneously generated 2130 Hz and 2750 Hz tones. Upon detecting the CAS signal, the CPE transmits a DTMF acknowledge signal (ACK) which indicates a readiness to receive Caller ID information. Central office equipment waits for the ACK signal before transmitting the Caller ID information. In order to detect the CAS, communications circuit 18 of telephone 10 includes a CAS detection system 24.

Applying telephone engineering terminology to the above situation, the first party is the "far-end" party and the receiving party is the "near-end" party. In order to prevent the far-end party from hearing the Caller ID signals, the central office equipment mutes (i.e., silences) signals being received and transmitted by the far-end party for a period of time beginning prior to generation of the SAS and CAS alerting signals and ending after the Caller ID information is transmitted. Similarly, the CPE is required to silence the signals being received and transmitted by the near-end party for a period of time beginning after the detection of the CAS signal and ending after the Caller ID information is transmitted.

Figure 3:
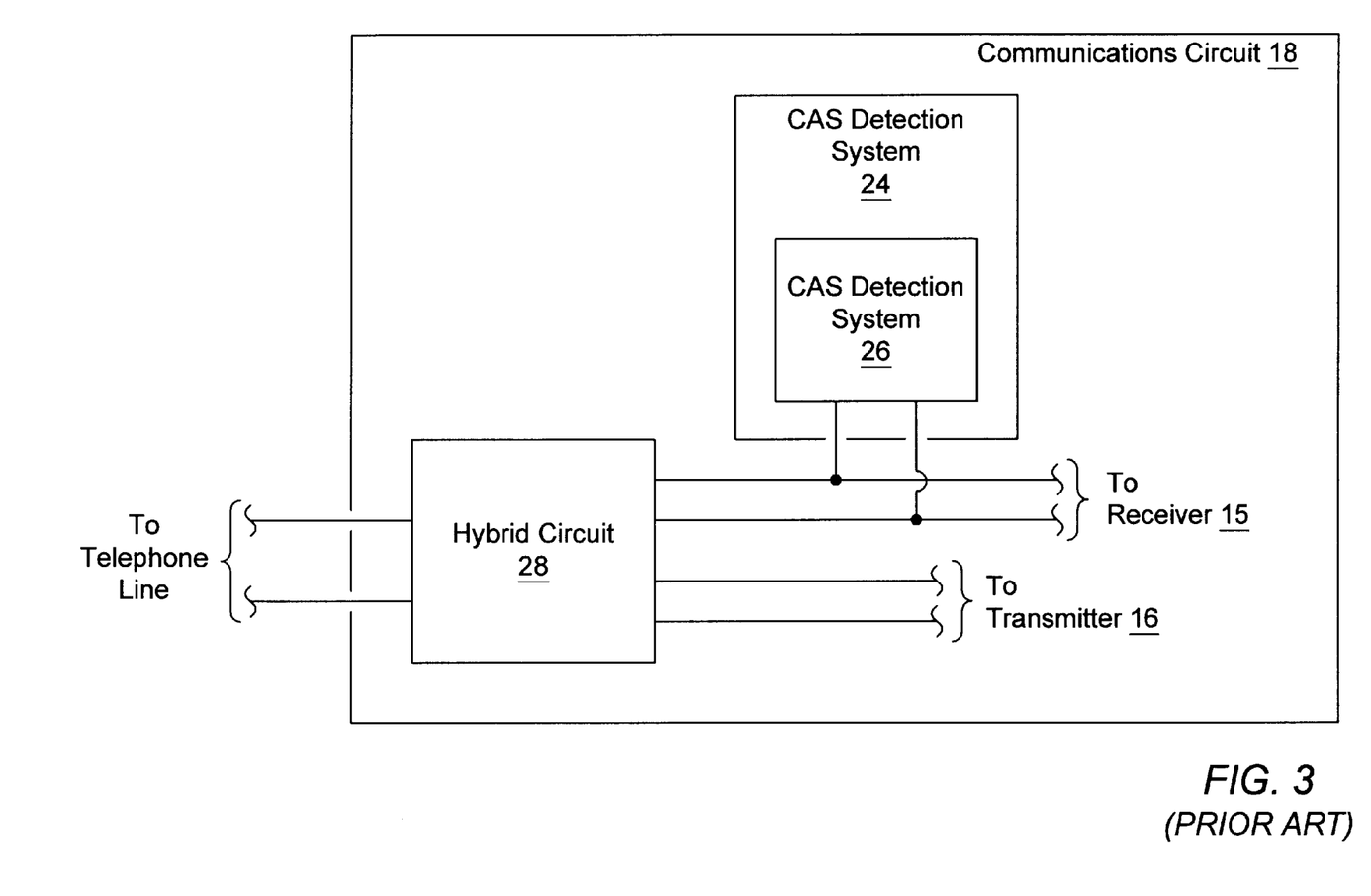
FIG. 3 is a block diagram of the communications circuit of the telephone of FIG. 2, the communications circuit including a CAS detection system, and the CAS detection system having a CAS detector coupled to a receiver signal line of the communications device.

FIG. 3 is a block diagram of a prior art embodiment of CAS detector system 24 including a CAS detector 26 coupled to a receiver output port of a hybrid circuit 28. The receiver output port of hybrid circuit 28 is also coupled to receiver 15. Hybrid circuit 28 also has an input port connected to transmitter 16. During use of telephone 10, an input/output port is connected to the two-wire telephone line. Hybrid circuit 28 couples signals from transmitter 16 to the two-wire telephone line, and couples signals from the telephone line to receiver 15. Hybrid circuits are used in telephone circuits to reduce the number of wires required for simultaneous voice transmission in opposite directions from four to two. CAS detector 26 produces (i.e., asserts) a CAS detect signal when a CAS is detected at the receiver output port of hybrid circuit 28.

While effective in reducing the number of wires required for simultaneous transmission in opposite directions, hybrid circuits are also commonly associated with transmission line discontinuities (i.e., impedance mismatches) which cause undesirable echos. An echo is a delayed and distorted version of a transmitted signal which is reflected back toward the source. A problem with telephone 10 employing prior art CAS detector 26 is that the CAS and echos are often received simultaneously by a CPE. Signals transmitted over telephone lines typically range from about 300 Hz to approximately 3,000 Hz. Thus both the 2130 Hz and the 2750 Hz components of the DTMF CAS fall within a telephone system voiceband extending from about 300 Hz to approximately 3,000 Hz. It is possible for echos to contain significant energies at the frequencies of one or both CAS components. In the configuration shown in FIG. 3, prior art CAS detector 26 is not capable of adequately guarding against false CAS detections in the presence of echos.

The problem manifests itself when a telephone subscriber has a CPE capable of receiving Mode 2 Caller ID information, but only has Call Waiting service. In this case, an echo may cause the CPE to falsely detect a CAS transmission following a Call Waiting SAS transmission. In response, the CPE may mute near-end voice signals, transmit an ACK signal, and wait for transmission of Mode 2 Caller ID information. Normal service may not be restored until a time-out period has expired during which the CPE did not receive Mode 2 Caller ID information as expected.

It would be desirable to have a reliable system and method for detecting DTMF signals which provide reliable CAS detection for Mode 2 Caller ID.

SUMMARY OF THE INVENTION

A communications device is presented including a DTMF detector for detecting a DTMF signal. A DTMF signal comprises a first DTMF tone and a second DTMF tone. The Mode 2 Caller ID CPE alerting signal (CAS) is one such DTMF signal. An input signal includes signal energy within a first portion of the input signal frequency range which includes the first DTMF tone, signal energy within a second portion of the input signal frequency range which includes the second DTMF tone, and signal energy within a third portion of the input signal frequency range which excludes the first and second DTMF tones.

The DTMF signal detector includes a first and second tone detection units, an extraneous signal detection unit, and detection logic. The first tone detection unit receive the input signal and produces an output signal dependent upon the signal energy within the first portion of the input signal frequency range. The second tone detection also receives the input signal and produces an output signal dependent upon the signal energy within the second portion of the input signal frequency range. The extraneous signal detection unit receives the input signal and produces an output signal dependent upon the signal energy within the third portion of the input signal frequency range. The detection logic receives the output signals produced by the first and second tone detection units and the extraneous signal detection unit, and produces a DTMF detect signal dependent upon the output signals.

When the DTMF signal is a Mode 2 Caller ID CAS, the first DTMF tone has a frequency of approximately 2130 Hz, and the second DTMF tone has a frequency of approximately 2750 Hz. The first portion of the input signal frequency range may be, for example, 2130±11 Hz, and the second portion of the input signal frequency range may be 2750±14 Hz.

In one embodiment, the first tone detection unit compares the signal energy within the first portion of the input signal frequency range to a predetermined first upper threshold value and first lower threshold value, where the first upper threshold value is greater than the first lower threshold value. The first tone detection unit produces a first output signal if the signal energy within the first portion exceeds the first upper threshold value, and produces a second output signal if the signal energy within the first portion exceeds the first lower threshold value.

Similarly, the second tone detection unit compares the signal energy within the second portion of the input signal frequency range to a predetermined second upper threshold value and second lower threshold value, where the second upper threshold value is greater than the second lower threshold value. The second tone detection unit produces a third output signal if the signal energy within the second portion exceeds the second upper threshold value, and produces a fourth output signal if the signal energy within the second portion exceeds the second lower threshold value. The extraneous signal detection unit produces a fifth output signal if the signal energy within the third portion of the input signal frequency range exceeds a third threshold value.

The detection logic receives the first, second, third, fourth, and fifth output signals, and produces the DTMF detect signal dependent upon the first, second, third, fourth, and fifth output signals. Specifically, the detection logic produces the DTMF detect signal if: (i) the first and third output signals are received, or (ii) the second and third output signals are received and the fifth output signal is not received, or (iii) the first and fourth output signals are received and the fifth output signal is not received, or (iv) the second and fourth output signals are received and the fifth output signal is not received.

A communications device in accordance with the present invention includes the DTMF detector described above. The communications device may be, for example, a telephone. The communications device may also include a transmitter signal line for conducting a transmit signal, a receiver signal line for conducting a receive signal, a hybrid circuit, and an echo canceler. The hybrid circuit is coupled to the transmitter signal line, the echo canceler, and the telephone line during use. The receive signal is present upon the telephone line. The hybrid circuit couples the transmit signal from the transmitter signal line to the telephone line, and provides the receive signal from the telephone line to the echo canceler.

The echo canceler has a first and second input ports and an output port coupled to the receiver signal line. The first input port receives the transmit signal from the transmitter signal line. The second input port receives the receive signal from the hybrid circuit. The echo canceler produces an output signal at the output port substantially devoid of any delayed version of the transit signal (i.e., echo) present within the receive signal.

A method of detecting the DTMF signal present within the input signal includes measuring the signal energy within the first, second, and third portions of the input signal frequency range. The measured signal energy within the first portion of the input frequency range is compared to the first upper threshold value and first lower threshold value. The measured signal energy within the second portion of the input frequency range is compared to the second upper threshold value and second lower threshold value. The measured signal energy within the third portion of the input frequency range is compared to the third threshold value.

The DTMF detect signal is produced if the signal energy within the first portion of the input signal frequency range is greater than the first upper threshold value and the signal energy within the second portion of the input signal frequency range is greater than the second upper threshold value. The DTMF detect signal is also produced if the signal energy within the first portion of the input signal frequency range is greater than the first lower threshold value, and the signal energy within the second portion of the input signal frequency range is greater than the second upper threshold value, and the signal energy within the third portion of the input signal frequency range is less than the third threshold value.

The DTMF detect signal is also produced if the signal energy within the first portion of the input signal frequency range is greater than the first upper threshold value, and the signal energy within the second portion of the input signal frequency range is greater than the second lower threshold value, and the signal energy within the third portion of the input signal frequency range is less than the third threshold value. The DTMF detect signal is also produced if the signal energy within the first portion of the input signal frequency range is greater than the first lower threshold value, and the signal energy within the second portion of the input signal frequency range is greater than the second lower threshold value, and the signal energy within the third portion of the input signal frequency range is less than the third threshold value.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Incorporation by Reference

The following publications are hereby incorporated by reference as though fully and completely set forth herein.

Bellcore Generic Requirements GR-30-CORE, "LSSGR: Voiceband Data Transmission Interface Section 6.6", Issue 1, December 1994, available from Bellcore Customer Relations, Piscataway, N.J.

Bellcore Technical Reference TR-NWT-000031, "CLASS[SM] Feature: Calling Number Delivery, FSD 01-02-1051," Issue 4, December 1992, available from Bellcore Customer Relations, Piscataway, N.J.

Bellcore Technical Reference TR-NWT-000575, "CLASS[SM] Feature: Calling Identity Delivery on Call Waiting, FSD 01-02-1090," Issue 1, December 1992, available from Bellcore Customer Relations, Piscataway, N.J.

Bellcore Technical Reference TR-NWT-001188, "CLASS[SM] Feature: Calling Name Delivery Generic Requirements, FSD 01-02-1070," Issue 1, December 1991, available from Bellcore Customer Relations, Piscataway, N.J.

Block Diagram of a Preferred Embodiment

Figure 4:
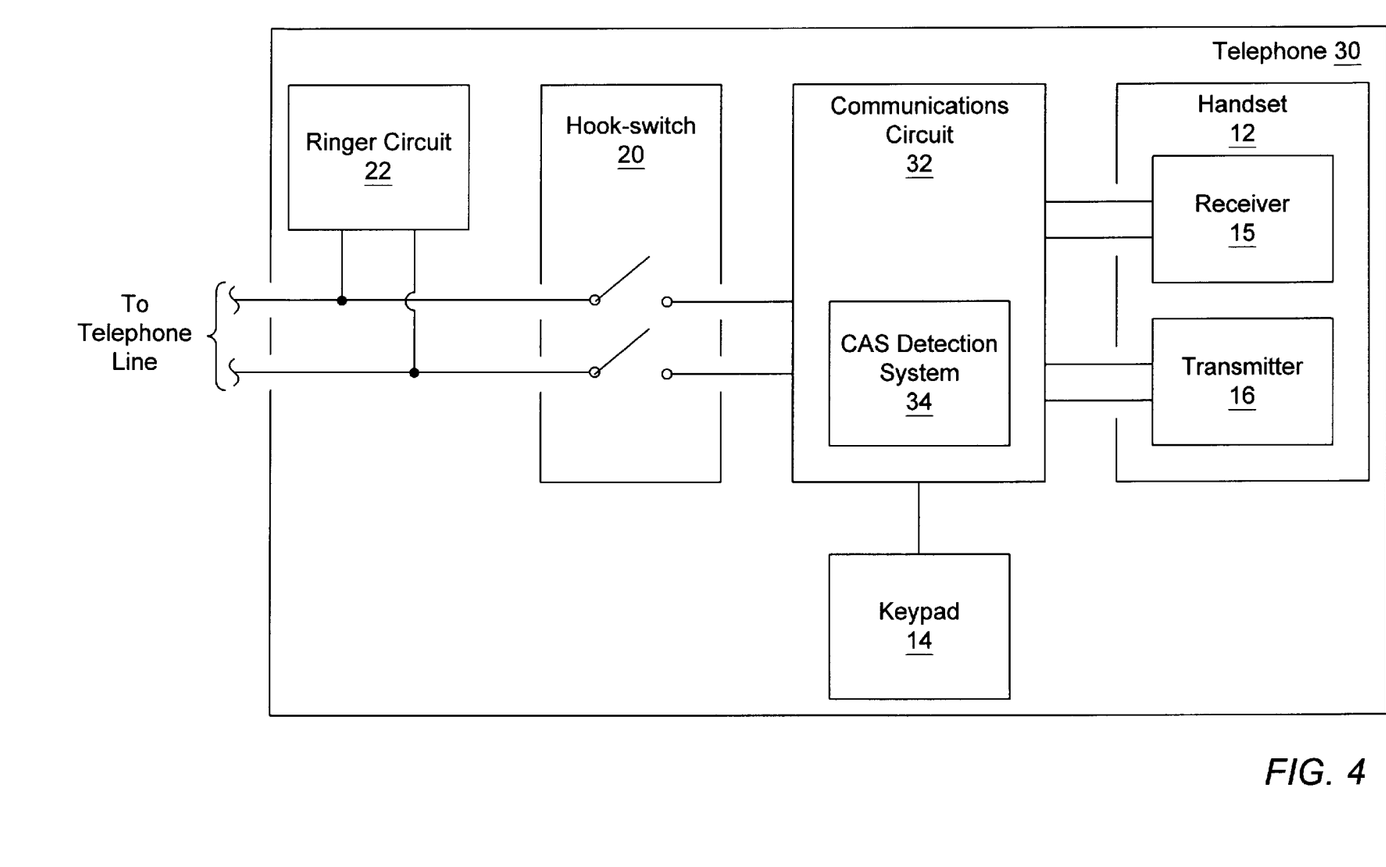
FIG. 4 is a block diagram of one embodiment of a communications device including a communications circuit according to the present invention.

FIG. 4 is a block diagram of a one embodiment of a communications device of the present invention (i.e., a telephone 30). FIG. 1 is also representative of telephone 30. Elements of telephone 10 shown in FIGS. 2–3 and described above which are also present in telephone 30 are numbered similarly. Telephone 30 includes a communications circuit 32 which operates in a manner similar to communications circuit 18 above, but includes an improved CAS detection system 34.

Figure 5:
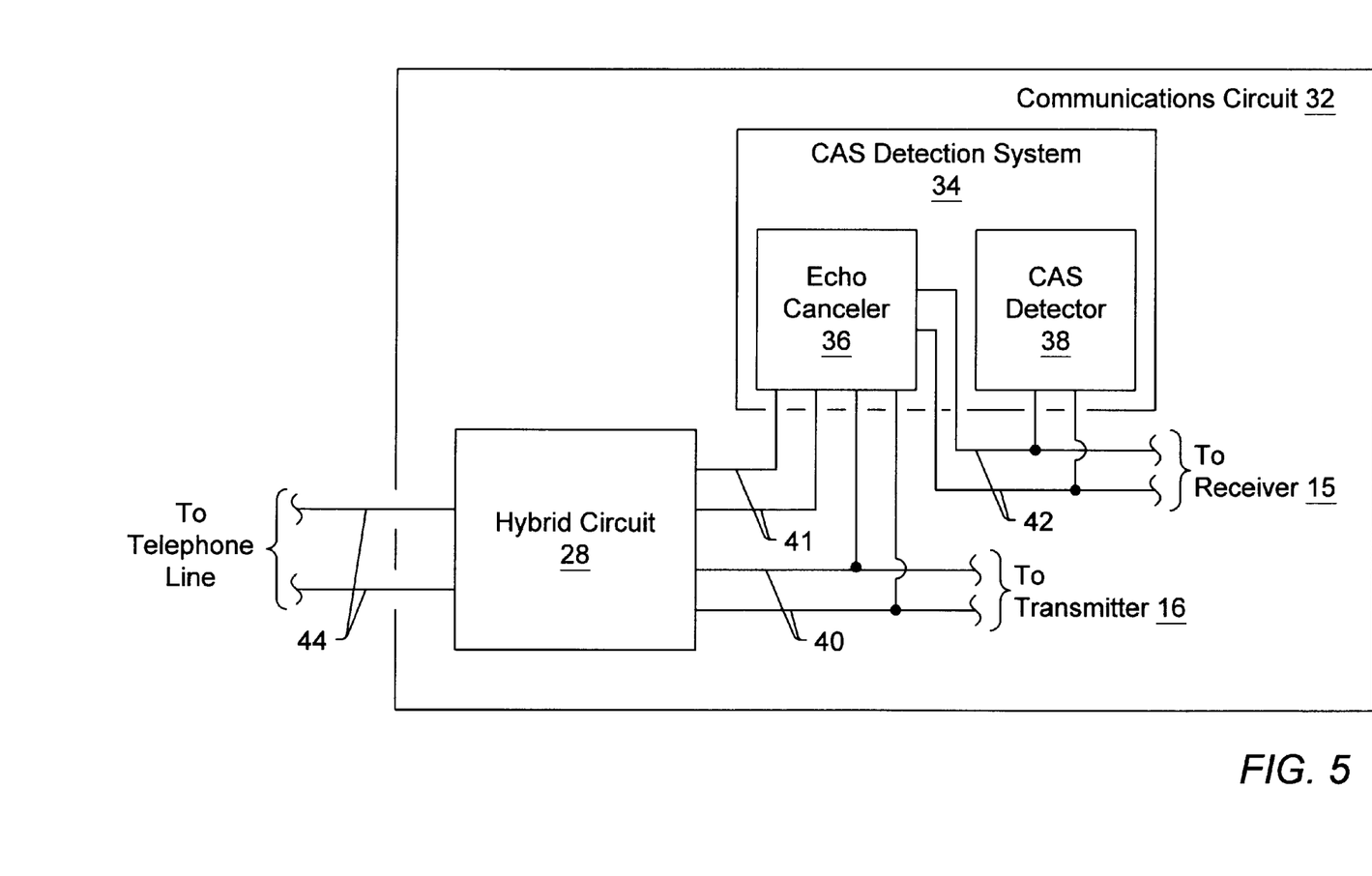
FIG. 5 is a block diagram of the communications circuit of the communications device of FIG. 4, wherein the communications circuit includes an improved CAS detection system having an echo canceler and an improved CAS detector.

FIG. 5 is a block diagram of communications circuit 32 which includes the improved CAS detection system 34. As shown in FIG. 5, CAS detection system 34 includes an echo canceler 36 and an improved CAS detector 38. Hybrid circuit 28 of communications circuit 32 has an input port coupled to transmitter 16 via a transmitter signal line 40, an output port coupled to echo canceler 36 via a signal line 41, and an input/output port connected to a two-wire signal line 44. Signal line 44 is coupled to a two-wire telephone line by hookswitch 20 during use of telephone 30.

As described above, hybrid circuit 28 couples transmit signals from transmitter signal line 40 to the telephone line, and also couples receive signals from the telephone line to echo canceler 36 during use of telephone 30. Hybrid circuit 28 allows the telephone line to carry transmit and receive signals in opposite directions simultaneously.

Echo canceler 36 has a fist input port coupled to transmitter signal line 40, a second input port coupled to hybrid circuit 28 via a signal line 41, and an output port coupled to receiver 15 via a receiver signal line 42. Echo canceler 36 receives a transmit signal from transmitter 16 via transmitter signal line 40 and a receive signal from hybrid circuit 28 via signal line 41. Echo canceler 36 uses the transmit signal and the receive signal to produce an output signal at the output port. The output signal is the receive signal substantially devoid of any delayed version of the transmit signal (i.e., echo) present within the receive signal.

CAS detector 38 has an input port coupled to receiver signal line 42, and produces a CAS detect signal when a CAS is detected. As will be described in detail below, CAS detector 38 has several functional units which work together to prevent the generation of a CAS detect signal when no CAS is present (i.e., a false CAS detect signal). CAS detector 38 receives the output signal produced by echo canceler 36. Echo canceler 36 thus prevents CAS detector 38 from receiving any echo following transmission of a SAS signal. Such an echo may contain significant frequency components corresponding to those of the CAS, and may cause CAS detector 38 to produce a false CAS detect signal.

Echo canceler 36 is included in the preferred embodiment of CAS detection system 34 in order to help prevent CAS detector 38 from producing a false CAS detect signal. It is noted that CAS detector 38 contains a significant amount of circuitry dedicated to preventing production of a false CAS detect signal, and thus CAS detector 38 may function with or without echo canceler 36.

Echo Canceler

Echo canceler 36 may embody any of the well known echo cancellation techniques. In a typical approach, the impulse response of a typical hybrid circuit and the signal produced by the transmitter are used to generate an estimate of the expected echo. The echo estimate is subtracted from the signal directed to the receiver, thereby effectively canceling the echo. A preferred echo cancellation technique is described in patent application Ser. No. 08/594,018 filed Jan. 29, 1996, by Zheng-Yi Xie et al and entitled "A System and Method for Performing Echo Cancellation in a Communications Network Employing a Mixed Mode LMS Adaptive Balance Filter," incorporated herein by reference.

CAS Detector

Figure 6:
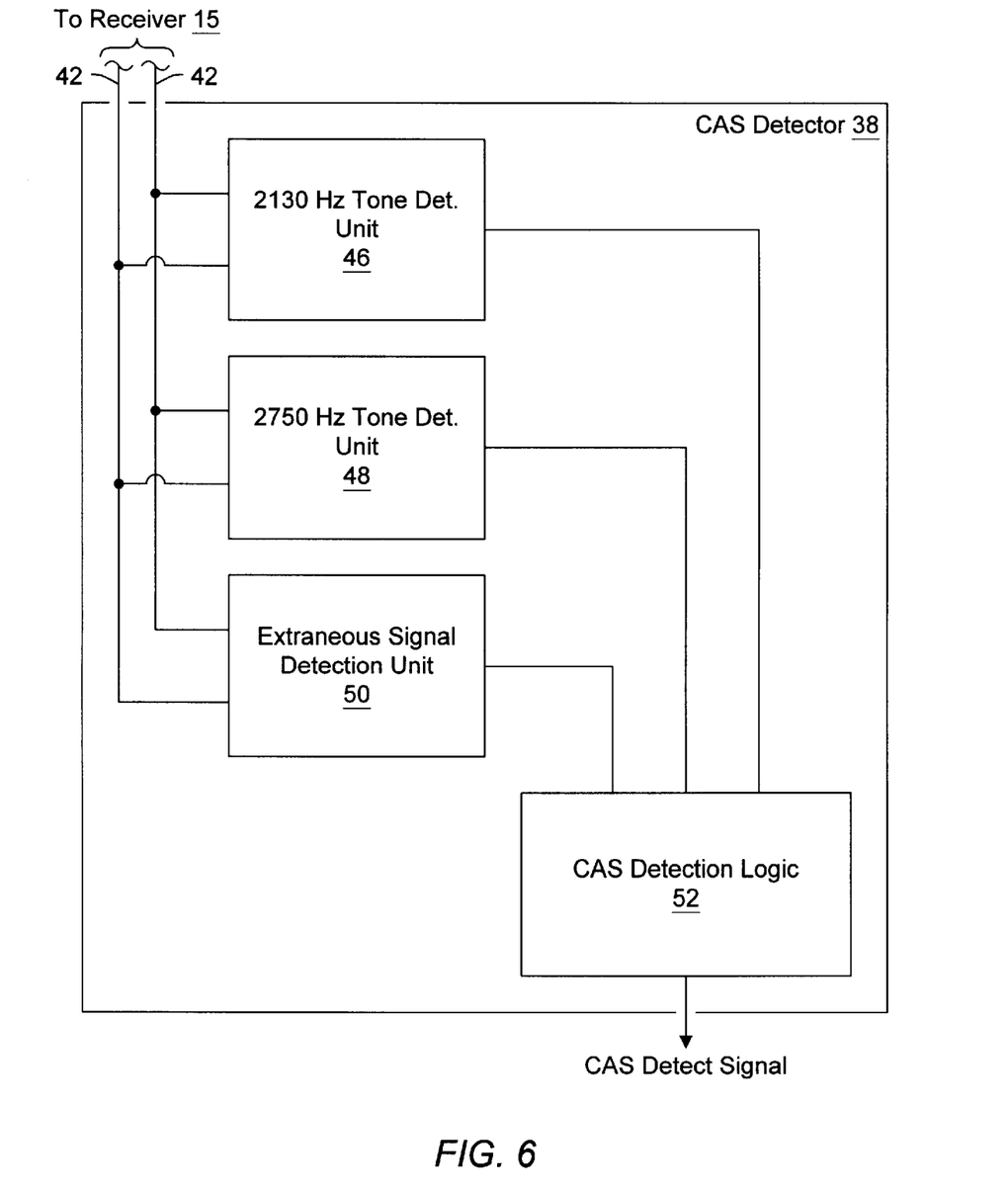
FIG. 6 is a block diagram of one embodiment of the improved CAS detector of FIG. 5, wherein the CAS detector includes a 2130 Hz tone detection unit, a 2750 Hz tone detection unit, an extraneous signal detection unit, and CAS detection logic.

FIG. 6 is a block diagram of the improved CAS detector 38. CAS detector 38 includes a 2130 Hz tone detection unit 46, a 2750 Hz tone detection unit 48, an extraneous signal detection unit 50, and CAS detection logic 52. 2130 Hz tone detection unit 46, 2750 Hz tone detection unit 48, and extraneous signal detection unit 50 have input ports connected to receiver signal line 42. Each receives the output signal produced by echo canceler 36 as an input signal at the input port.

The input signal includes contributions of frequency components occurring within a range of frequencies, typically from about 300 Hz to approximately 3,000 Hz. The input signal includes signal energy within a first portion of the input signal frequency range which includes the first DTMF tone at 2130 Hz. The first portion may be, for example, 2130±11 Hz. The input signal also includes signal energy within a second portion of the input signal frequency range which includes the second DTMF tone at 2750 Hz. The second portion may be, for example, 2750±14 Hz. The input signal also includes signal energy within a third portion of the input signal frequency range which excludes the first and second portions of the input signal frequency range. The third portion of the input signal range may include, for example, a significant portion of the frequency components of human speech signals.

2130 Hz tone detection unit 46 produces an output signal at an output port, wherein the output signal is dependent upon the signal energy within the first portion of the input signal frequency range. Similarly, 2750 Hz tone detection unit 48 produces an output signal at an output port, wherein the output signal is dependent upon the signal energy within the second portion of the input signal frequency range. Extraneous signal detection unit 50 produces an output signal at an output port, wherein the output signal is dependent upon the signal energy within the third portion of the input signal frequency range. CAS detection logic 52 receives the output signals produced by 2130 Hz tone detection unit 46, 2750 Hz tone detection unit 48, and extraneous signal detection unit 50, and produces a CAS detect signal dependent upon the output signals.

Tone Detection Units

Figure 7:
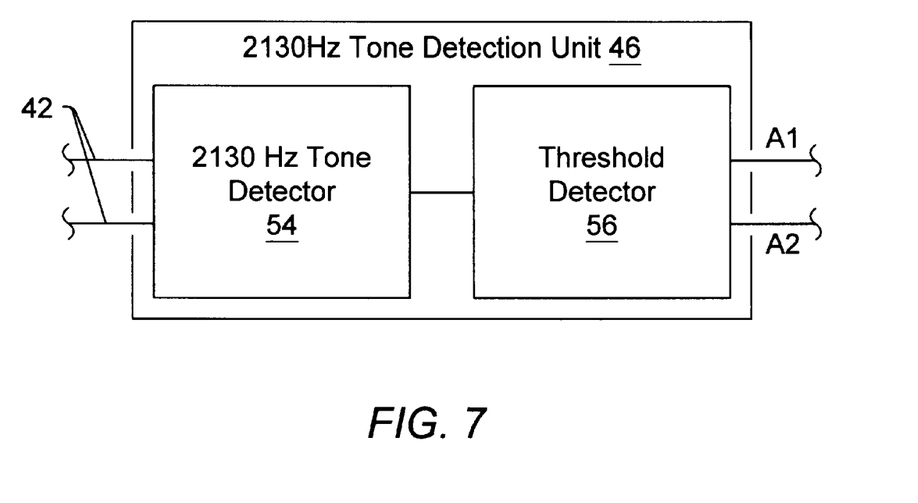
FIG. 7 is a block diagram of one embodiment of the 2130 Hz tone detection unit of FIG. 6.
Figure 8:
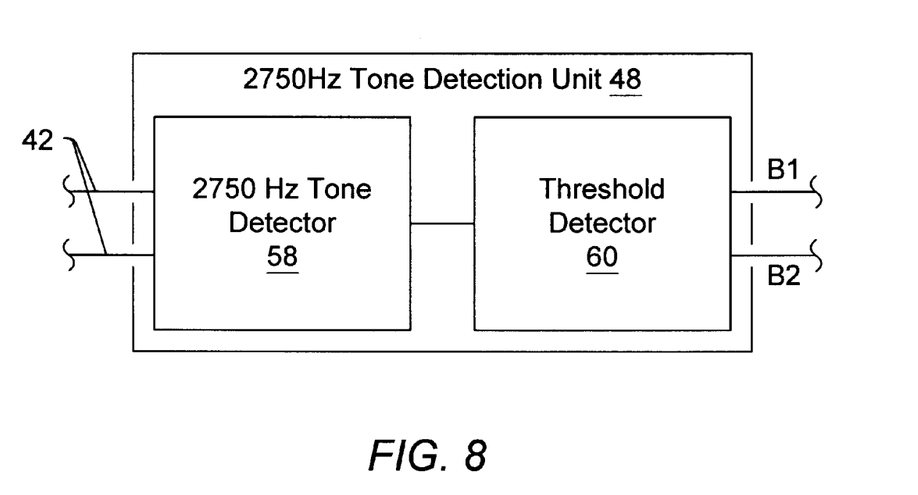
FIG. 8 is a block diagram of one embodiment of the 2750 Hz tone detection unit of FIG. 6.

2130 Hz tone detection unit 46 and 2750 Hz tone detection unit 48 each include a tone detector and a threshold detector. FIG. 7 is a block diagram of one embodiment of 2130 Hz tone detection unit 46. 2130 Hz tone detection unit 46 includes a 2130 Hz tone detector 54 and a threshold detector 56. Threshold detector 56 is coupled to receive an output of 2130 Hz tone detector 54. FIG. 8 is a block diagram of one embodiment of 2750 Hz tone detection unit 48. 2750 Hz tone detection unit 48 includes a 2750 Hz tone detector 58 and a threshold detector 60. Threshold detector 60 is coupled to receive an output of 2750 Hz tone detector 58.

2130 Hz tone detector 54 and 2750 Hz tone detector 58 may carry out signal energy determinations in the frequency domain. Accordingly, 2130 Hz tone detector 54 and 2750 Hz tone detector 58 may sample the analog amplitude of the input signal at regular intervals, convert the analog amplitude to corresponding digital values, and perform a mathematical transformation operation to convert the input time-domain signal to its frequency-domain equivalent. Such domain transformations are typically accomplished using a discrete Fourier transform (DFT) operation. A preferred (second-order) Goertzel algorithm evaluates only a single frequency component of an input signal, and is thus particularly well suited to tone detection. The Goertzel algorithm is described in *Digital Signal Processing Applications Using the ADSP*-2100 *Family* by Analog Devices, Inc., Volume 1, pp. 458–478, Prentice-Hall, Inc., Englewood Cliffs, N.J., incorporated herein by reference.

An n-point DFT transforms n samples of an input signal, equally spaced in time, to the frequency domain. Magnitudes and phase angles of frequency components of the input signal may be computed at discrete frequency points within a frequency range bounded at an upper end by half the sampling frequency. The interval between discrete frequency points is equal to the sampling frequency divided by n. 2130 Hz tone detector 54 and 2750 Hz tone detector 58 may use an 8 kHz sampling rate which is standard within the telephone industry.

If a tone in the input signal does not fall exactly on one of the discrete frequency points, the energy of the tone is divided among the closest discrete frequency points. This phenomenon is called leakage. In order to avoid leakage, it is desirable for the frequencies of all tones to be detected to fall exactly upon discrete frequency points. It has been determined that for 2130 Hz tone detector 54, a sample frame including 169 consecutive samples obtained using an 8 kHz sampling rate which is standard compromise between computation speed and accuracy (i.e., reduces leakage to an acceptable level). 2130 Hz tone detector 54 may embody a second-order Goertzel algorithm to evaluate the $45^{th}$ discrete frequency point of a 169-point DFT. For 2750 Hz tone detector 58, a sample frame including 160 consecutive samples obtained using an 8 kHz sampling rate affords a similar acceptable compromise. 2750 Hz tone detector 58 may embody a second-order Goertzel algorithm to evaluate the $55^{th}$ discrete frequency point of a 160-point DFT.

It is noted that 2130 Hz tone detector 54 and 2750 Hz tone detector 58 may embody other types of well known methods of isolating frequency components. An alternate DFT operation may be used to evaluate discrete frequency points corresponding to two DTMF tones. A fast Fourier transform (FFT) operation may be used to evaluate all discrete frequency points corresponding to n samples of an input signal, and the discrete frequency points which do not correspond to two DTMF tones may be discarded. In addition, various well known analog and digital filtering methods may be employed.

Threshold Detectors

In the embodiment of FIG. 7, threshold detector 56 of 2130 Hz tone detection unit 46 produces two output signals "A1" and "A2". Output signals A1 and A2 are dependent upon the signal energy within the first portion of the input signal frequency range (i.e., the output of 2130 Hz tone detector 54). Threshold detector 56 produces output signals A1 and A2 by comparing the output of 2130 Hz tone detector 54 to a predetermined first upper threshold value and first lower threshold value. The first upper threshold value is greater than the first lower threshold value. Threshold detector 56 produces (i.e., asserts) output signal A1 if the output of 2130 Hz tone detector 54 exceeds the first upper threshold value. Threshold detector 56 asserts output signal A2 if the output of 2130 Hz tone detector 54 exceeds the first lower threshold value. The first upper threshold value and the first lower threshold value are established by a user, preferably in order to minimize the generation of false CAS detect signals.

In the embodiment of FIG. 8, threshold detector 60 of 2750 Hz tone detection unit 48 produces two output signals "B1" and "B2". Output signals B1 and B2 are dependent upon the signal energy within the second portion of the input signal frequency range (i.e., the output of 2750 Hz tone detector 58). Threshold detector 60 produces output signals B1 and B2 by comparing the output of 2750 Hz tone detector 58 to a predetermined second upper threshold value and second lower threshold value. The second upper threshold value is greater than the second lower threshold value. Threshold detector 60 asserts output signal B1 if the output of 2750 Hz tone detector 58 exceeds the second upper threshold value. Threshold detector 60 asserts output signal B2 if the output of 2750 Hz tone detector 58 exceeds the second lower threshold value. The second upper threshold value and the second lower threshold value are established by a user, preferably in order to minimize the generation of false CAS detect signals.

Extraneous Signal Detection Unit

Figure 9:
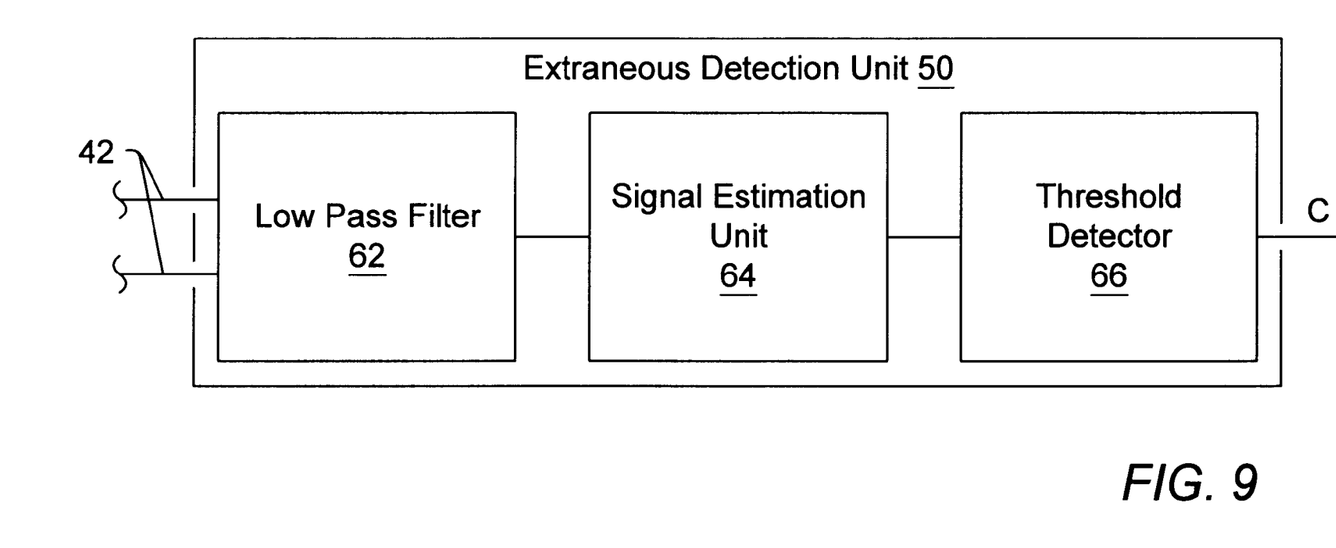
FIG. 9 is a block diagram of one embodiment of the extraneous signal detection unit of FIG. 6.

FIG. 9 is a block diagram of one embodiment of extraneous signal detection unit 50. Extraneous signal detection unit 50 includes a low pass filter 62, a signal estimation unit 64, and a threshold detector 66. In the embodiment of FIG. 9, threshold detector 66 produces a single output signal "C". Output signal C is dependent upon the signal energy within the third portion of the input signal frequency range.

Low pass filter 62 is used to substantially remove signal frequencies within the first and second portions of the input signal frequency range. In the case of a CAS signal, the 2130 Hz and 2750 Hz DTMF tones are located in an upper portion of the 300 Hz to 3,000 Hz input signal frequency range. Low pass filter 62 may be a second-order low pass filter having a "cutoff" frequency of approximately 2,000 Hz. In this case, low pass filter 62 substantially passes frequency components below about 2,000 Hz and substantially attenuates frequency components above 2,000 Hz. Low pass filter 62 thus effectively removes signal frequencies in the first and second portions of the input signal frequency range, and the output of low pass filter 62 contains signal frequencies in the third portion of the input signal frequency range.

Signal estimation unit 64 is coupled to receive the output of low pass filter 62. Signal estimation unit may embody an algorithm which produces a value proportional to the signal energy within the third portion of the input signal frequency range. Signal estimation unit 64 may sample the amplitude of the input signal x at regular intervals, and sum a resulting value y with a fraction of a previous value of y according to:

$$y(n) = \left[\frac{1}{a}\right] \cdot |x(n)| + \left[\frac{a-1}{a}\right] \cdot y(n-1)$$

where n is a sample number. Sampling may again be performed at the industry standard 8 kHz rate. The value of a is selected by the user, and is preferably selected such that:

$$\left[\frac{1}{a}\right] + \left[\frac{a-1}{a}\right] = 1.0$$

The value of a may range from 2 to 10, with a preferred value of approximately 8.

The value y is then used to produce an output signal Y(n) where Y(n) is the maximum value of y in a sample frame having a selected sample length:

$$Y(n) = \max[y(n)]_{n=0}^{n=N-1}$$

where N is the number of samples in the sample frame. Output signal Y(n) is proportional to the signal energy within the third portion of the input signal frequency range (i.e., the output of low pass filter 62). As described above, the third portion of the input signal frequency range includes a significant portion of the frequency components of human speech signals.

Threshold detector 66 produces output signal "C" by comparing the output of signal estimation unit 64 to a predetermined third threshold value. Threshold detector 66 asserts output signal C if the output of signal estimation unit 64 exceeds the third threshold value. The third threshold value is established by a user, preferably in order to minimize the generation of false CAS detect signals.

CAS Detection Logic

CAS detection logic 52 receives output signals A1 and A2 produced by 2130 Hz tone detection unit 46, output signals B1 and B2 produced by 2750 Hz tone detection unit 48, and output signal C produced by extraneous signal detection unit 50. CAS detection logic 52 produces (i.e., asserts) the CAS detect signal if output signals A1 and B1 are received (i.e., asserted). In this case, the signal energy within the first portion of the input signal frequency range is greater than the first upper threshold value and the signal energy within the second portion of the input signal frequency range is greater than the second upper threshold value.

CAS detection logic 52 also asserts the CAS detect signal if output signals A2 and B1 output signals are received and the C output signal is not received. In this case, the signal energy within the first portion of the input signal frequency range is greater than the first lower threshold value, the signal energy within the second portion of the input signal frequency range is greater than the second upper threshold value, and the signal energy within the third portion of the input signal frequency range is less than the third threshold value.

CAS detection logic 52 also asserts the CAS detect signal if output signals A1 and B2 output signals are received and the C output signal is not received. In this case, the signal energy within the first portion of the input signal frequency range is greater than the first upper threshold value, and the signal energy within the second portion of the input signal frequency range is greater than the second lower threshold value, and the signal energy within the third portion of the input signal frequency range is less than the third threshold value.

CAS detection logic 52 also asserts the CAS detect signal if output signals A2 and B2 output signals are received and the C output signal is not received. In this case, the signal energy within the first portion of the input signal frequency range is greater than the first lower threshold value, and the signal energy within the second portion of the input signal frequency range is greater than the second lower threshold value, and the signal energy within the third portion of the input signal frequency range is less than the third threshold value.

Method

A method of detecting a DTMF signal (e.g., a CAS signal) present within the input signal includes measuring the signal energy within the first, second, and third portions of the input signal frequency range. The measured signal energy within the first portion of the input frequency range is compared to the first upper threshold value and first lower threshold value. The measured signal energy within the second portion of the input frequency range is compared to the second upper threshold value and second lower threshold value. The measured signal energy within the third portion of the input frequency range is compared to the third threshold value.

The DTMF detect signal is produced if the signal energy within the first portion of the input signal frequency range is greater than the first upper threshold value and the signal energy within the second portion of the input signal frequency range is greater than the second upper threshold value. The DTMF detect signal is also produced if the signal energy within the first portion of the input signal frequency range is greater than the first lower threshold value, and the signal energy within the second portion of the input signal frequency range is greater than the second upper threshold value, and the signal energy within the third portion of the input signal frequency range is less than the third threshold value.

The DTMF detect signal is also produced if the signal energy within the first portion of the input signal frequency range is greater than the first upper threshold value, and the signal energy within the second portion of the input signal frequency range is greater than the second lower threshold value, and the signal energy within the third portion of the input signal frequency range is less than the third threshold value. The DTMF detect signal is also produced if the signal energy within the first portion of the input signal frequency range is greater than the first lower threshold value, and the signal energy within the second portion of the input signal frequency range is greater than the second lower threshold value, and the signal energy within the third portion of the input signal frequency range is less than the third threshold value.

CONCLUSION

Therefore, a communications device including an improved CAS detection system is presented. The CAS detection system includes an improved CAS detector, and also preferably includes an echo canceler. A method for reliable detection of a CAS is also presented. A CAS includes a first DTMF tone (2130 Hz) and a second DTMF tone (2750 Hz). One embodiment of the communications device is a telephone.

An input signal includes signal energy within a first portion of the input signal frequency range which includes the first DTMF tone, signal energy within a second portion of the input signal frequency range which includes the second DTMF tone, and signal energy within a third portion of the input signal frequency range which excludes the first and second DTMF tones.

The CAS detector contains a significant amount of circuitry dedicated to preventing assertion of a false CAS detect signal. The CAS detector includes a first and second tone detection units, an extraneous signal detection unit, and detection logic. The first and second tone detection units receive the input signal and produce an output signal dependent upon the signal energy within respective first and second portions of the input signal frequency range. The extraneous signal detection unit also receives the input signal and produces an output signal dependent upon the signal energy within the third portion of the input signal frequency range. The detection logic receives the output signals produced by the first and second tone detection units and the extraneous signal detection unit, and produces a CAS detect signal dependent upon the output signals.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A DTMF signal detector for detecting a DTMF signal present within an input signal, wherein the DTMF signal detector is configured to receive signals having frequencies in a frequency range, wherein the frequency range comprises a first portion including a first DTMF tone frequency, a second portion including a second DTMF tone frequency, and a third portion which excludes the first and second portions, the DTMF signal detector comprising:

a first tone detection unit operable to receive the input signal and configured to produce a first output signal if the signal energy within the first portion of the input signal frequency range exceeds a first upper threshold value and a fourth output signal if the signal energy within the first portion of the input signal frequency range exceeds a first lower threshold value;

a second tone detection unit operable to receive the input signal and configured to produce a second output signal if the signal energy within the second portion of the input signal frequency range exceeds a second upper threshold value and a fifth output signal if the signal energy within the second portion of the input signal frequency range exceeds a second lower threshold value;

an extraneous signal detection unit operable to receive the input signal and configured to produce a third output signal if the signal energy within the third portion of the input signal frequency range exceeds a predetermined threshold value; and detection logic operable to receive the output signals produced by the first and second tone detection units and the extraneous signal detection unit, wherein the detection logic is configured to produce a DTMF detect signal if one or more of the following is true:

(i) the first and second output signals are received;

(ii) the fourth and second output signals are received and the third output signal is not received;

(iii) the first and fifth output signals are received and the third output signal is not received; and (iv) the fourth and fifth output signals are received and the third output signal is not received.

2. The DTMF signal detector as recited in claim 1, wherein the DTMF signal is a Mode 2 Caller ID CPE alerting signal (CAS).

3. The DTMF signal detector as recited in claim 1, wherein the first DTMF tone frequency is approximately 2130 Hz, and wherein the second DTMF tone frequency is approximately 2750 Hz.

4. The DTMF signal detector as recited in claim 1, wherein the first portion of the frequency range is 2130±11 Hz, and wherein the second portion of the frequency range is 2750±14 Hz.

5. The DTMF signal detector as recited in claim 1, wherein the first upper threshold value is greater than the first lower threshold value.

6. The DTMF signal detector as recited in claim 1, wherein the second upper threshold value is greater than the second lower threshold value.

7. A communications device, comprising:

a hybrid circuit having an input port, an output port, and an input/output port, wherein the input port is operable to receive a transmit signal, wherein the input/output port is coupled to a telephone line during use, and wherein the hybrid circuit is configured to: (i) couple a transmitter signal line to the telephone line so that the transmit signal received by the input port can be transmitted on the telephone line, and (ii) couple the telephone line to the output port so that a receive signal received from the telephone line can be transmitted to the output port;

an echo canceler having first and second input ports and an output port, wherein the first input port is operable to receive the transmit signal, wherein the second input port is coupled to the hybrid circuit output port and is operable to receive the receive signal, wherein the echo canceler is configured to produce an output signal at the output port, and wherein the output signal is substantially the receive signal devoid of any portion of the transmit signal delayed in time and present within the receive signal; and a DTMF detector operable to receive the output signal of the echo canceler as an input signal, wherein the DTMF detector is configured to detect a DTMF signal present within the input signal, and wherein the DTMF signal comprises a first DTMF tone and a second DTMF tone, wherein the input signal includes signal energy within a frequency range having a first portion including the first DTMF tone frequency, a second portion including the second DTMF tone frequency, and a third portion which excludes the first and second DTMF tone frequencies, and wherein the DTMF detector is configured to produce a DTMF detect signal if one or more of the following is true:

(i) the signal energy within the first portion of the input signal frequency range is greater than a first upper threshold value and the signal energy within the second portion of the input signal frequency range is greater than a second upper threshold value;

(ii) the signal energy within the first portion of the input signal frequency range is greater than a first lower threshold value, and the signal energy within the second portion of the input signal frequency range is greater than the second upper threshold value, and the signal energy within the third portion of the input signal frequency range is less than a third threshold value;

(iii) the signal energy within the first portion of the input signal frequency range is greater than a first upper threshold value, and the signal energy within the second portion of the input signal frequency range is greater than a second lower threshold value, and the signal energy within the third portion of the input signal frequency range is less than the third threshold value; and (iv) the signal energy within the first portion of the input signal frequency range is greater than the first lower threshold value, and the signal energy within the second portion of the input signal frequency range is greater than the second lower threshold value, and the signal energy within the third portion of the input signal frequency range is less than the third threshold value.

8. The communications device as recited in claim 7, wherein the communications device is a telephone.

9. The communications device as recited in claim 7, wherein the DTMF signal is a Mode 2 Caller ID CPE alerting signal (CAS).

10. The communications device as recited in claim 7, wherein the first DTMF tone frequency is about 2130 Hz, and wherein the second DTMF tone frequency is approximately 2750 Hz.

11. The communications device as recited in claim 7, wherein the first portion of the input signal frequency range is 2130±11 Hz, and wherein the second portion of the input signal frequency range is 2750±14 Hz.

12. The communications device as recited in claim 7, wherein the DTMF signal detector comprises:

a first tone detection unit operable to receive the input signal and configured to produce an output signal dependent upon the signal energy within the first portion of the input signal frequency range;

a second tone detection unit operable to receive the input signal and configured to produce an output signal dependent upon the signal energy within the first portion of the input signal frequency range;

an extraneous signal detection unit operable to receive the input signal and configured to produce an output signal dependent upon the signal energy within the third portion of the input signal frequency range; and detection logic operable to receive the output signals produced by the first and second tone detection units and the extraneous signal detection unit, wherein the detection logic is configured to produce a DTMF detect signal dependent upon the output signals produced by the first and second tone detection units and the extraneous signal detection unit.

13. A method of detecting a DTMF signal present within an input signal, wherein the DTMF signal comprises a first DTMF tone and a second DTMF tone, and wherein the input signal includes signal energy within a frequency range, the method comprising:

measuring signal energy within a first portion of the input signal frequency range which includes a first DTMF tone frequency;

measuring signal energy within a second portion of the input signal frequency range which includes a second DTMF tone frequency;

measuring signal energy within a third portion of the input signal frequency range which excludes the first and second DTMF tone frequencies; and producing a DTMF detect signal if one or more of the following is true:

(i) the signal energy within the first portion of the input signal frequency range is greater than a first upper threshold value and the signal energy within the second portion of the input signal frequency range is greater than a second upper threshold value;

(ii) the signal energy within the first portion of the input signal frequency range is greater than a first lower threshold value, and the signal energy within the second portion of the input signal frequency range is greater than the second upper threshold value, and the signal energy within the third portion of the input signal frequency range is less than a third threshold value;

(iii) the signal energy within the first portion of the input signal frequency range is greater than a first upper threshold value, and the signal energy within the second portion of the input signal frequency range is greater than a second lower threshold value, and the signal energy within the third portion of the input signal frequency range is less than the third threshold value; and (iv) the signal energy within the first portion of the input signal frequency range is greater than the first lower threshold value, and the signal energy within the second portion of the input signal frequency range is greater than the second lower threshold value, and the signal energy within the third portion of the input signal frequency range is less than the third threshold value.

14. The method as recited in claim 13, wherein the DTMF signal is a Mode 2 Caller ID CPE alerting signal (CAS).

15. The method as recited in claim 13, wherein the first DTMF tone frequency is about 2130 Hz, and wherein the second DTMF tone frequency is approximately 2750 Hz.

16. The method as recited in claim 13, wherein the first portion of the input signal frequency range is 2130±11 Hz, and wherein the second portion of the input signal frequency range is 2750±14 Hz.

* * * * *